US008792193B2

(12) United States Patent
Leong et al.

(10) Patent No.: US 8,792,193 B2
(45) Date of Patent: Jul. 29, 2014

(54) MAGNETIC MEDIA TESTER AND A METHOD OF MAGNETIC MEDIA TESTING

(75) Inventors: Siang Huei Leong, Singapore (SG); Budi Santoso, Singapore (SG); Chun Lian Ong, Singapore (SG); Joo Boon Marcus Travis Lim, Singapore (SG); Zhimin Yuan, Singapore (SG); Kaidong Ye, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 243 days.

(21) Appl. No.: 13/260,714

(22) PCT Filed: Mar. 26, 2010

(86) PCT No.: PCT/SG2010/000119
§ 371 (c)(1),
(2), (4) Date: Sep. 27, 2011

(87) PCT Pub. No.: WO2010/110753
PCT Pub. Date: Sep. 30, 2010

(65) Prior Publication Data
US 2012/0019952 A1    Jan. 26, 2012

Related U.S. Application Data

(60) Provisional application No. 61/164,015, filed on Mar. 27, 2009.

(51) Int. Cl.
*G11B 27/36* (2006.01)
(52) U.S. Cl.
USPC .............. 360/31; 360/25; 360/75; 360/77.02; 369/53.1; 369/53.12

(58) Field of Classification Search
None
See application file for complete search history.

(56) References Cited

U.S. PATENT DOCUMENTS

| | | | |
|---|---|---|---|
| 5,121,260 A * | 6/1992 | Asakawa et al. | 360/31 |
| 5,689,057 A | 11/1997 | Baumgart et al. | |
| 5,806,978 A * | 9/1998 | Abraham et al. | 374/1 |
| 5,901,001 A * | 5/1999 | Meyer et al. | 360/25 |
| 6,293,135 B1 * | 9/2001 | Marchon et al. | 73/1.89 |
| 6,421,207 B1 | 7/2002 | Sato | |
| 6,459,669 B1 * | 10/2002 | Fujita et al. | 369/59.1 |
| 6,696,831 B2 * | 2/2004 | Nozu | 324/210 |
| 6,785,081 B2 * | 8/2004 | Chapin et al. | 360/75 |
| 6,829,118 B1 * | 12/2004 | Takamiya et al. | 360/73.03 |
| 6,934,111 B2 * | 8/2005 | Krause et al. | 360/75 |
| 7,196,513 B2 | 3/2007 | Perez | |
| 7,212,474 B2 * | 5/2007 | Van Helvoirt et al. | 369/44.32 |
| 7,630,086 B2 * | 12/2009 | Oak et al. | 356/600 |

(Continued)

OTHER PUBLICATIONS

PCT International Search Report for PCT Counterpart Application No. PCT/SG2010/000119 containing Communication relating to the Results of the International Search Report, 6 pgs., (Jul. 20, 2010).

(Continued)

*Primary Examiner* — Dismery Mercedes
(74) *Attorney, Agent, or Firm* — Blakely, Sokoloff, Taylor & Zafman LLP

(57) ABSTRACT

A magnetic media tester comprising a Laser Doppler Vibrometer (LDV) head; and a magnetic read head; the LDV head and the magnetic read head being configured for obtaining correlatable data of a region on a magnetic disk.

10 Claims, 6 Drawing Sheets

(56) References Cited

U.S. PATENT DOCUMENTS

| | | | |
|---|---|---|---|
| 7,724,462 B2* | 5/2010 | Duan et al. .................. | 360/75 |
| 8,338,742 B2* | 12/2012 | Flechsig et al. ............ | 219/121.6 |
| 2004/0036996 A1* | 2/2004 | Krause et al. ................ | 360/75 |
| 2007/0165239 A1 | 7/2007 | Jann et al. | |
| 2007/0229999 A1 | 10/2007 | Meier et al. | |
| 2007/0245814 A1 | 10/2007 | Shitara et al. | |
| 2008/0100966 A1* | 5/2008 | Ozeki .................. | 360/235.4 |
| 2008/0137225 A1* | 6/2008 | Duan et al. .................. | 360/75 |
| 2008/0164942 A1 | 7/2008 | Takeuchi et al. | |
| 2008/0186020 A1 | 8/2008 | Fujita | |
| 2008/0198493 A1 | 8/2008 | Shitara et al. | |
| 2010/0124154 A1* | 5/2010 | Yu et al. .................. | 369/53.12 |

OTHER PUBLICATIONS

PCT Written Opinion of the International Searching Authority for PCT Counterpart Application No. PCT/SG2010/000119, 7 pgs., (Jul. 20, 2010).

PCT International Preliminary Report on Patentability (Chapter II of the Patent Cooperation Treaty) for PCT Counterpart Application No. PCT/SG2010/000119, 9 pgs., (Dec. 22, 2010).

Maik Duwensee, et al., "Tribology and Nano-Tribology Problems in Data Storage on Hard Disks", Center for Magnetic Recording Research, University of California, San Diego, pp. 1-7, (Dec. 2006).

"LDV—Laser Doppler Vibrometer—Applications to Data Storage Dynamics", Polytec, pp. 1-9, (Sep. 2001).

* cited by examiner

US 8,792,193 B2

MAGNETIC MEDIA TESTER AND A METHOD OF MAGNETIC MEDIA TESTING

CROSS-REFERENCE TO RELATED APPLICATIONS

This patent application is a U.S. National Phase application under 35 U.S.C. §371 of International Application No. PCT/SG2010/000119, filed Mar. 26, 2010, entitled A MAGNETIC MEDIA TESTER AND A METHOD OF MAGNETIC MEDIA TESTING, which claims priority to U.S. provisional patent application No. 61/164,015, filed Mar. 27, 2009.

TECHNICAL FIELD

The present invention relates to magnetic media testers and testing, and particularly, to a magnetic media tester for certification and testing of magnetic media.

BACKGROUND TO THE INVENTION

As areal density of hard disks increases, bit dimensions on hard disks correspondingly decrease, leading to increased testing time when testing each disk completely. Conventional media testers for head based certification typically use a flying head with a read sensor. For high resolution testing, the read sensor needs to be narrow at about 200 to 400 nm, resulting in longer testing times. For a read sensor width ranging from 150 to 350 nm, if only one certification head is used, a complete or full measurement of just one disk having a radius of 0.7 to 1.6 inches at 7200 rpm can take from 8 to 22 minutes, as shown in FIG. 1. As bit dimensions further reduce, read sensors will correspondingly narrow, resulting in even longer testing times for full disk scanning.

In a typical media fabrication process, head based media certifiers are used to detect defects on disk media. As an alternative to head based certification, optical based certification using a Laser Doppler Vibrometer (LDV) provides shorter testing times as shown in FIG. 2 due to use of a larger beam spot that allows each disk to be completely tested more quickly. However, this has a disadvantage of reduced resolution due to the larger spot size and furthermore, the detection capability of LDV-based detection is less than that for head based certifiers. Optical certifiers are therefore not usually used alone for defect detection of hard disks. Head based certifiers are more commonly used although optical certifiers are gaining importance as increasing disk densities will lead to longer certification times required by head based certifiers.

SUMMARY OF THE INVENTION

According to a first exemplary aspect, there is provided a magnetic media tester comprising a Laser Doppler Vibrometer (LDV) head and a magnetic read head; the LDV head and the magnetic read head being configured for obtaining correlatable data of a region on a magnetic disk.

Data obtained by the magnetic read head and data obtained by the LDV head are preferably correlated by calibration of the magnetic read head and calibration of the LDV head with a calibration feature on the magnetic disk.

The magnetic media tester may further comprise a data enhancement module for enhancing data obtained by the LDV head, wherein the data enhancement module is configured to eliminate variation in a background signal and enhance at least one detected signal riding on the background signal. The data enhancement module is preferably configured to define a set of sequential data points obtained by the LDV head encompassing the at least one detected signal, compute a fitted line value for each data point in the set of sequential data points, and square a difference between each data point and its fitted line value. The data enhancement module is preferably further configured to accumulate the squared difference between each data point and its fitted line value.

The region mentioned above may be a defect region, the LDV, head being configured for determining location of the defect region and the magnetic read head being configured for characterizing a defect in the defect region.

Data obtained by the LDV head is preferably usable for verifying data obtained by the magnetic read head.

According to a second exemplary aspect, there is provided a method of magnetic media testing. The method comprises calibrating a Laser Doppler Vibrometer (LDV) head and a magnetic read head on a magnetic media tester with a calibration feature on a magnetic disk to correlate data obtained by the LDV head and the magnetic read head; determining a region on the disk using the LDV head; and characterizing a feature in the region using the magnetic read head.

Calibrating preferably comprises correlating location of the magnetic read head with location of an optical beam spot of the LDV head, and may further comprise concurrently scanning the calibration feature with the magnetic read head and the LDV head.

The method preferably comprises enhancing data obtained by the LDV head, wherein enhancing data obtained by the LDV head comprises eliminating variation in a background signal and enhancing at least one detected signal riding on the background signal. This may comprise defining a set of sequential data points obtained by the LDV head encompassing the at least one detected signal, computing a fitted line value for each data point in the set of sequential data points, and squaring a difference between each data point and its fitted line value. Enhancing data obtained by the LDV head may further comprise accumulating the squared difference between each data point and its fitted line value.

The method may further comprise verifying data obtained by the magnetic read head with data obtained by the LDV head.

According to a third exemplary aspect, there is provided a method of data enhancement for a complex signal set comprising a background signal and at least one detected signal riding on the background signal. The method comprises eliminating variation in the background signal and enhancing the at least one detected signal.

Eliminating variation in the background signal preferably comprises defining a set of sequential data points in the complex signal set; computing a fitted line value for each data point in the set of sequential data points; and squaring a difference between each data point and its fitted line value.

Enhancing the at least one detected signal preferably comprises encompassing the at least one detected signal within the set of sequential data points defined.

The method of the third aspect may further comprise accumulating the squared difference between each data point and its fitted line value.

DETAILED DESCRIPTION OF EXEMPLARY EMBODIMENTS

A magnetic media tester according to the present invention will be described with reference to FIGS. 3 to 14 below.

Figure 1:
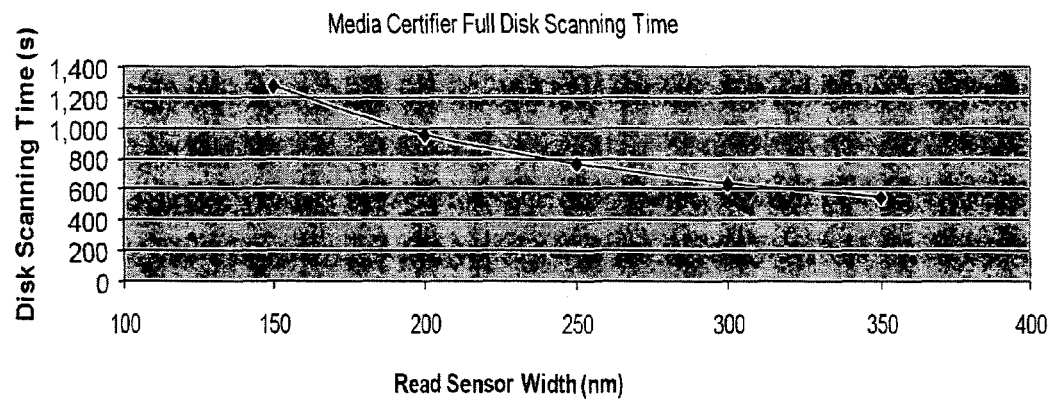
FIG. 1 is a graph illustrating a full disk testing time using a head based certifier.
Figure 2:
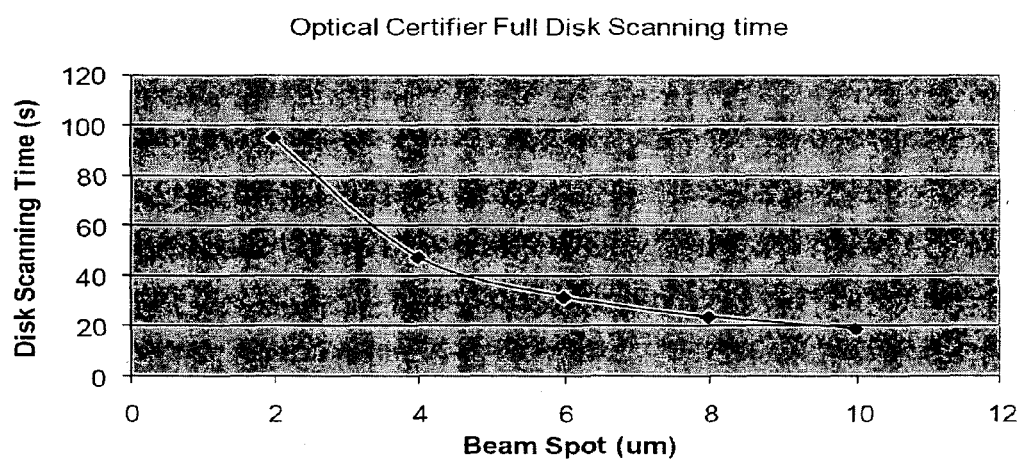
FIG. 2 is a graph illustrating a full disk testing time using an optical certifier.
Figure 3:
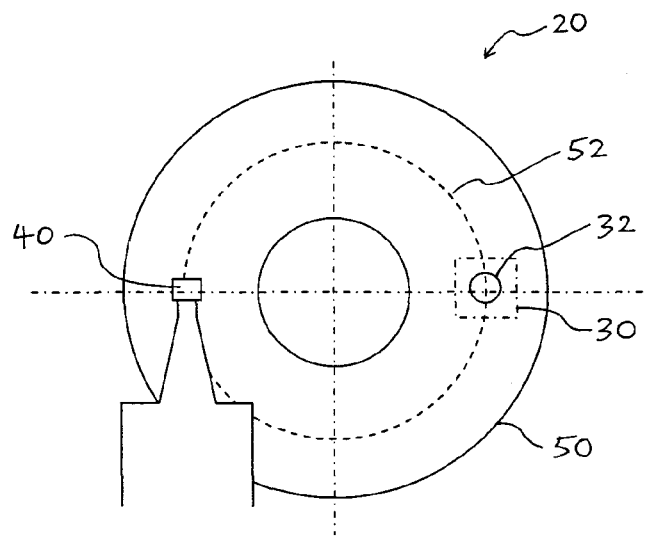
FIG. 3 is a schematic plan view illustration of an LDV head and a magnetic read head of a magnetic media tester according to the present invention on a same track of a disk but 180° out of phase.

The magnetic media tester 20 comprises a Laser Doppler Vibrometer (LDV) head 30 and at least one magnetic read head 40 attached to a slider for maintaining a consistent flying height above a disk 50, as shown in FIG. 3. The LDV head 30 and the magnetic read head 40 are provided to be able to read a same track 52 of the disk 50. The LDV head 30 and magnetic read head 40 may be disposed to be 180° out of phase with each other as shown, or may be disposed in any other arrangement that allows for their 30, 40 obtaining correlatable data of the disk 50. To achieve that, the magnetic media tester 20 is configured such that the LDV head 30 and the magnetic read head 40 can both scan a same region of the disk 50 concurrently, and scanning data thus obtained by the LDV head 30 and the magnetic read head 40 can be correlated for the same scanned region. In this way, at least two sets of data can be obtained for any targeted region of the disk 50, a first set being obtained by the LDV head 30 and a second set being obtained by the magnetic read head 40 or vice versa. Where a second magnetic read head is provided, a third set of data for the same region can also be obtained.

The LDV head 30 and the magnetic read head 40 are preferably translatable with respect to the disk 50 by use of positioners so as to be able to measure different tracks on the disk 50 without requiring translation of the disk 50 in the magnetic media tester 20. An air bearing spindle is provided to spin the disk for testing.

Data obtained by the magnetic read head 40 and data obtained by the LDV head 30 are preferably correlated by calibrating the magnetic read head 40 and the LDV head 30 with a calibration feature on the magnetic disk 50 prior to testing the disk 50. As an example, the calibration feature may be laser bump patterns on the ID of the disk 50, or may be any other known existing or specially prepared feature or marks on the disk 50. Calibration correlates location of the magnetic read head 40 with location of an optical beam spot 32 of the LDV head 30, so as to correlate data subsequently obtained by the respective heads 40, 30.

Figure 4:
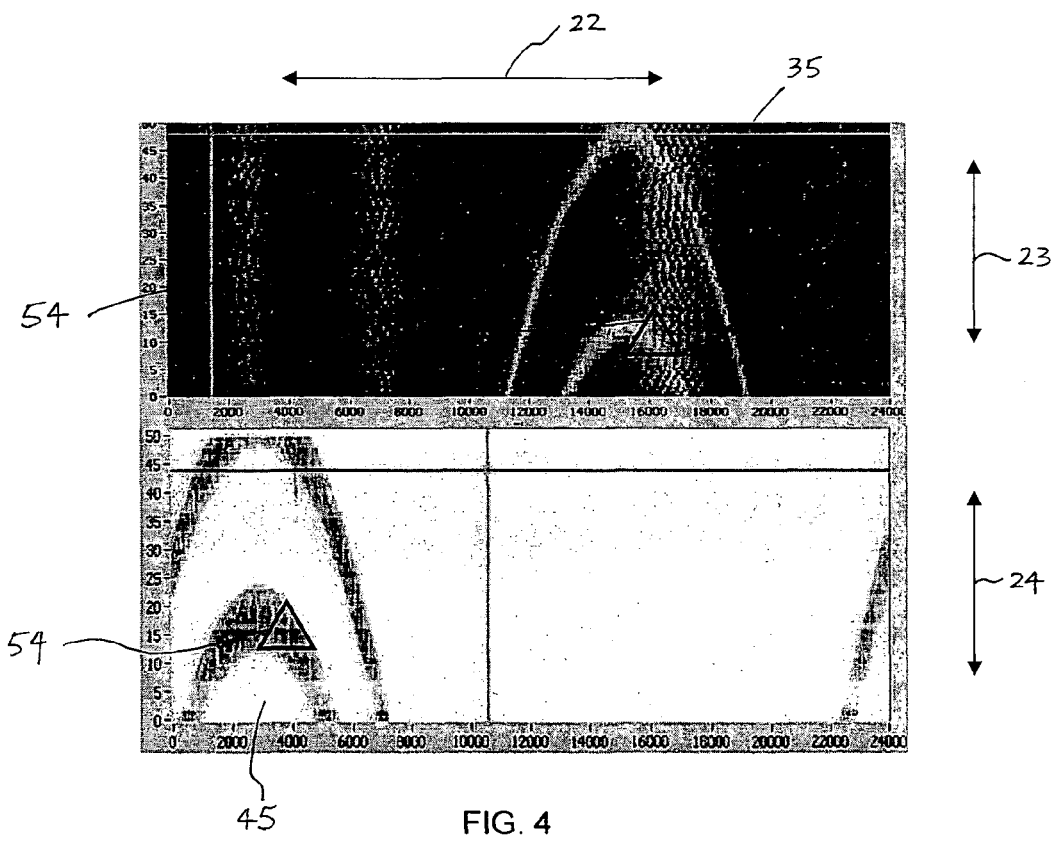
FIG. 4 depicts images obtained by an LDV head and a magnetic read head of a laser bump region of a disk for use in calibrating the LDV head and the magnetic read head.

During calibration, both the magnetic head 40 and the LDV head 30 are positioned at locations that enable both heads 30, 40 to scan the calibration feature of the disk 50 concurrently. Images 35, 45 of the calibration feature such as the laser bump patterns are then obtained by concurrently scanning the calibration feature using the magnetic read head 30 and the LDV head 40, as shown in FIG. 4. The two images 35, 45 are correlated by taking note of any cross-track 23, 24 offset and down-track 22 offset between the images of the calibration feature and computationally compensating for them when generating scanning results. For example, as shown in FIG. 4, triangles 54 indicate a same spot as imaged by the LDV head 30 as well as the magnetic read head 40. Any difference in cross-track and down-track offset is recorded and used to correct for differences in positioning between the magnetic read head 40 and the LDV head 30.

Once the magnetic media tester 20 has been calibrated as described above, subsequent movement of the magnetic read head 40 or the LDV head 30 by the positioners may be tracked and compensated for with respect to the calibrated original positioning of the magnetic read head 40 and the LDV head 30. In this way, calibration only needs to be performed once for every disk tested regardless of subsequent movements of the magnetic read head 40 and the LDV head 30 to scan other tracks or areas of the disk.

Figure 5:
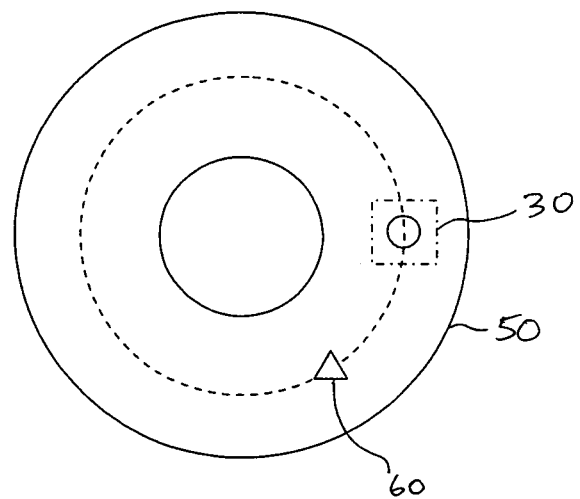
FIG. 5 is a schematic plan view illustration of the LDV head of the magnetic media tester detecting a defect region on a disk.
Figure 6:
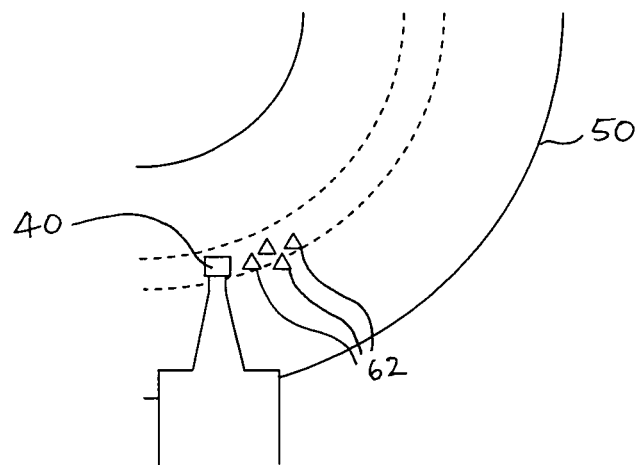
FIG. 6 is a schematic close-up plan view illustration of the magnetic read head of the magnetic media tester characterizing the defect region of FIG. 5.

It is envisaged that the magnetic media tester 20 will be used to determine defects on a disk. As such, as shown in FIG. 5, the LDV head 30 is preferably configured for determining location of a defect region 60 on the disk 50, while the magnetic read head 40 is preferably configured for characterizing defects 62 in the defect region 60, as shown in FIG. 6. As an example, the magnetic read head 40 may use a missing extra pulse (MEP) approach to determine defect size.

To determine defects using the magnetic media tester 20, the disk 50 can be first scanned using the LDV head 30 to locate any defect regions 60. Because the LDV beam spot 32 is larger than the magnetic read head 40, the defect region 60 can be more quickly located compared to fully scanning the disk 50 with the magnetic read head 40. Once a defect region such as 60 is located, measurement of the same defect region 60 by magnetic read head 40 can be initiated.

Figure 7:
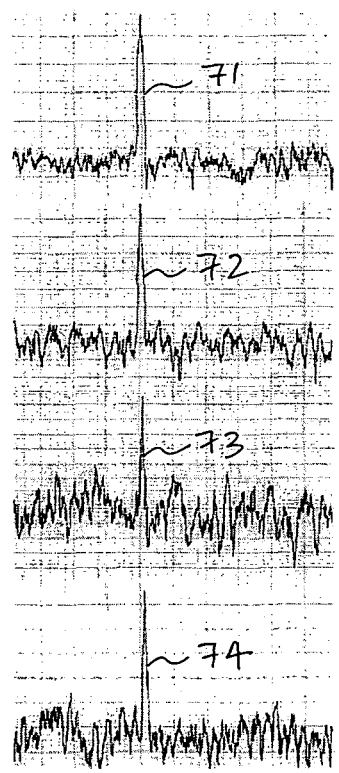
FIG. 7 depicts LDV head measurements of defects on a disk in raw signal form.

FIG. 7 shows raw signal measurements obtained by the LDV head 30 of four features 71, 72, 73, 74 mimicking defects on a disk 50. The four features 71, 72, 73, 74 were nanoscratches formed on the disk 50 using a focused ion beam, all having a depth of 20 nm and widths of 500 nm, 200 nm, 80 nm and 100 nm respectively. As can be seen from the generally similar output for the features 71, 72, 73, 74, detailed information of the defects such as defect size cannot be accurately obtained using the LDV head.

Figure 8:
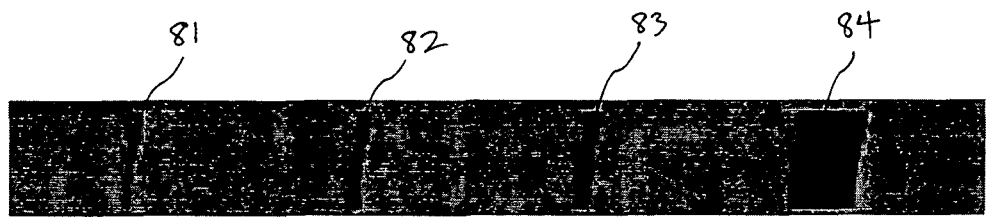
FIG. 8 shows magnetic read head measurements of defects on a disk in image form.
Figure 9:
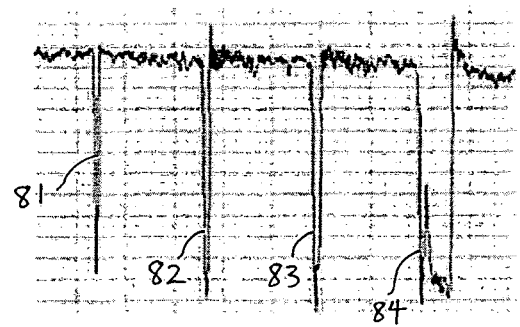
FIG. 9 shows magnetic read head measurements of the defects of FIG. 8 in raw signal form.

If detailed defect classification and characterization is required, the defect region 60 can be zoomed into using the magnetic read head 40 which has a very high resolution compared to the LDV head 30. For example, FIGS. 8 and 9 show respective image form and raw signal form output of the magnetic read head 40 for four features 81, 82, 83, 84 on a disk. Again, the four features 81, 82, 83, 84 were nanoscratches formed using a focused ion beam, all having a depth of 50 nm and widths of 200 nm, 500 nm, 1000 nm and 5000 nm respectively. As can be seen, output from the magnetic read head 40 is able to distinguish more clearly between the different widths of the features 81, 82, 83, 84 scanned, allowing defect sizes to be accurately determined.

Providing both the LDV head 30 and the magnetic read head 30 in correlation with each other in the magnetic media tester 20 thus allows faster full disk measurement since any defect region can be quickly found using the LDV head 30 which is some ten times faster than the magnetic read head 40. Subsequently, only the defect region needs to be analyzed in detail using the high resolution magnetic read head 40, saving time from analyzing the whole disk in detail using the magnetic read head 40. In this way, certification or testing time of magnetic media can be reduced without compromising testing resolution even as areal density increases.

Due to limitations in detection capability of the LDV resulting from its beam size, detection of very small defects such as those less than 1 um is possible but relatively difficult. The magnetic media tester 20 therefore preferably also comprises a data enhancement module for enhancing data obtained by the LDV head 30. The data enhancement module enhances LDV detection capability to resolve feature sizes of 100 nm or less in width and 5 nm in depth. For example, an 80 nm width defect can be routinely detected using the LDV head 30 with data enhancement by the data enhancement module. For defect detection in hard disks, down-track spatial accuracy is not of absolute importance as the main purpose is to accept or reject a disk as well as to provide opportunity to further distinguish different types of defects with reasonable precision in down-track positioning.

Figure 10:
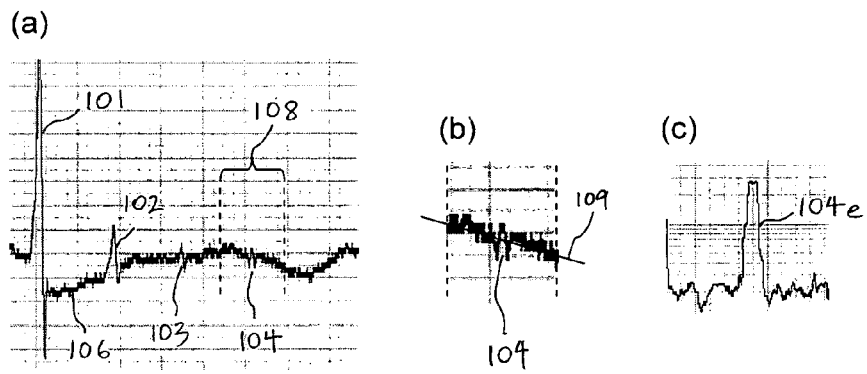
FIG. 10 illustrates enhancement of raw signal data obtained by the LDV head.

FIG. 10(*a*) shows LDV displacement raw signals of four defect-mimicking features 101, 102, 103, 104 that were formed on a disk using a focused ion beam, all 200 nm wide and having depths of 50 nm, 20 nm, 10 nm and 5 nm respectively. As can be seen, LDV measurements are sensitive to low frequency variation 106 due to factors such as disk runout and micro-waviness of the disk. For features smaller than the amplitude of the low frequency variation 106, a simple threshold detection will not work where the signals obtained for these features are at a different voltage level with respect to each other. For example, as shown in FIG. 10(*a*), the signals of the four defect-mimicking features 101, 102, 103, 104 ride on top of the low frequency signal 106 and are at different voltage levels with respect to each another.

The enhancement module is provided to eliminate the low frequency variation 106 of the background signal by implementing polynomial fitting according to the low frequency signal morphology. However, elimination of this variation often results in erroneous information obtained. To avoid this, enhancing the LDV data involves first defining a small error moving down-track window 108 comprising a set of sequential data points (e.g. $x_0$ to $x_n$) as shown in FIG. 10(*a*), wherein a detected signal 104 is encompassed within the set of sequential data points. The advantage of this is that, for a small window, signal morphology is linear and it is easy to perform a line fit according to standard line fit formulae such as a linear fitted line. Accordingly, as can be seen in a close-up of the window 108 in FIG. 10(*b*), a linear fitted line 109 has been computed for the sequential data points in the window 108 so that each data point within the window 108 has a corresponding fitted line value, as given by equation (1) below:

$$y_{fn} = ax_n + b \qquad (1)$$

where $$a = \frac{n\sum xy - (\sum x)(\sum y)}{n\sum (x^2) - (\sum x)^2}$$

and $$b = \frac{\sum y - a(\sum x)}{n}$$

Subsequently, by squaring a difference between each data point and its fitted line value, and accumulating this information across the whole downtrack scanning range using equation (2) below, as shown in FIG. 10(*c*), information of the defect 104*e* obtained by the LDV head 30 is now greatly enhanced.

$$y_m = \sum_{i=0}^{n} (y_n - y_{fn})^2 \qquad (2)$$

where $y_m$ is the enhanced signal.

Figure 11:
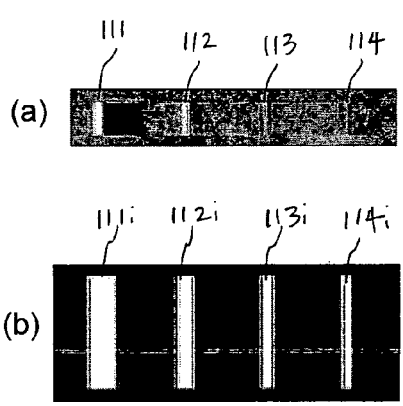
FIG. 11 depicts enhancement of data obtained by the LDV head for features that are 200 nm wide on a disk.

FIG. 11 shows results obtained by the LDV head 30 for four features formed by a focused ion beam on a disk, all four features being 200 nm wide with depths of 50 nm, 20 nm, 10 nm and 5 nm respectively. Compared to the normal images 111, 112, 113, 114 obtained without data enhancement as shown in FIG. 11(*a*), enhanced images 111*i*, 112*i*, 113*i*, 114*i* (FIG. 11(*b*)) that are generated from enhanced LDV data 111*e*, 112*e*, 113*e*, 114*e* (FIG. 11(*c*)) are clearly superior.

Figure 12:
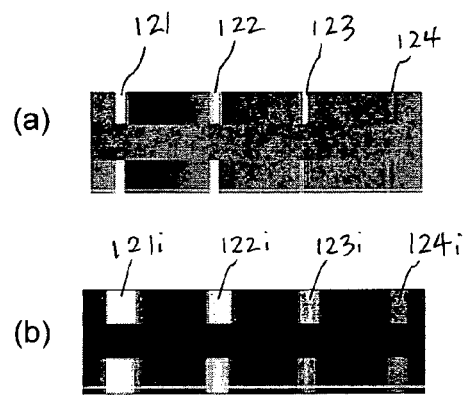
FIG. 12 depicts enhancement of data obtained by the LDV head for features that are 500 nm wide on a disk.

Similarly, FIG. 12 shows results obtained by the LDV head 30 for four features formed by a focused ion beam on a disk, all four features this time being 500 nm wide with depths of 50 nm, 20 nm, 10 nm and 5 nm respectively. Again, the enhanced images 121*i*, 122*i*, 123*i*, 124*i* (FIG. 12(*b*)) that are generated from enhanced LDV data 121*e*, 122*e*, 123*e*, 124*e* (FIG. 11(*c*)) are clearly superior to the normal images 121, 122, 123, 124 obtained without data enhancement (FIG. 11(*a*)).

The present data enhancement method thus has a two-fold advantage of removing the low frequency variation of the background signal while enhancing the defect signals that ride on top of the low frequency variation. This data enhancement method is not limited only to the LDV but can also be applied to other testing and measurement applications where a detected signal is found to ride on top of a larger but slower varying background signal.

Another advantage of providing both the LDV head 30 and the magnetic read head 40 in correlation with each other in the magnetic media tester 20 is that data obtained by the LDV head 30 may be used to verify data obtained by the magnetic read head 40, or vice versa, so as to ensures result integrity. For example, it is known that when using separate optical certifiers or head based certifiers to test a disk, non-repeatable or systematic errors present in each certifier cannot detected. By concurrently scanning or testing a disk using the correlated LDV head 30 and magnetic read head 40, measurements from both the LDV head 30 and the magnetic read head 40 may be used for cross checking to eliminate spurious test results and thereby prevent misinterpretation of test data.

Figure 13:
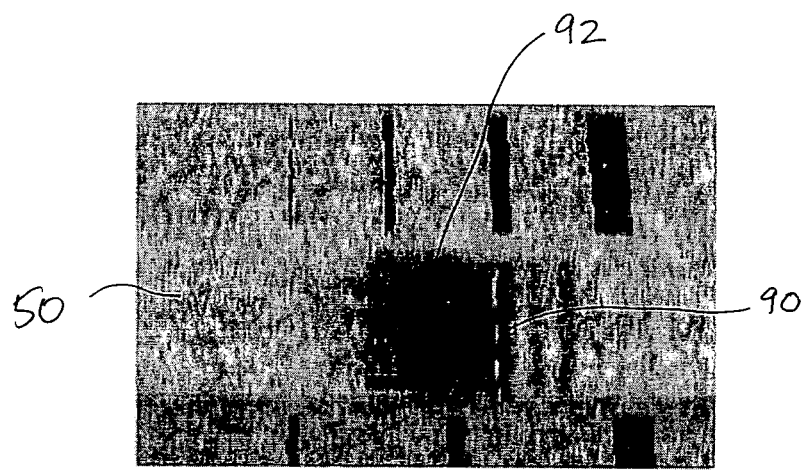
FIG. 13 depicts magnetic read head measurements in image form of a region having apparent magnetic variation.
Figure 14:
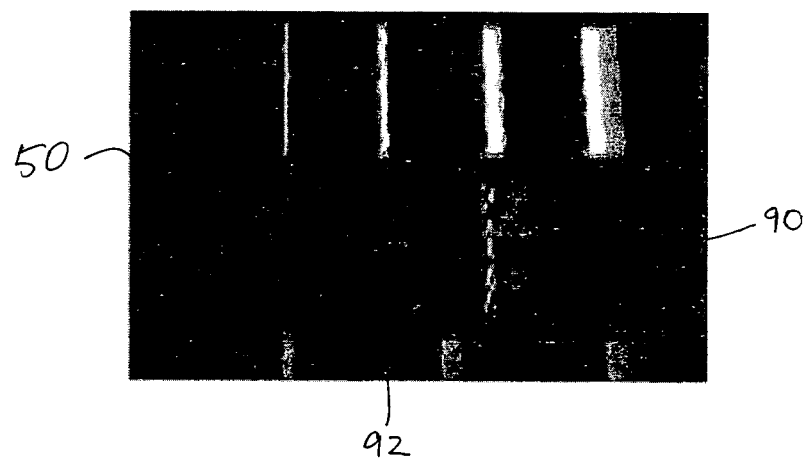
FIG. 14 depicts LDV head measurements in image form of the region of FIG. 13.

For example, as shown in FIG. 13, magnetic read head 40 imaging of a mark 90 created by an optical surface analyzer on a disk 50 shows an adjacent region of apparent magnetic variation 92. However, concurrent LDV head 30 imaging of the same mark 90 as shown in FIG. 14 shows no actual defect present on the disk 50 in the same adjacent region 92. It is known that fly height changes when the slider flies over a physical defect on a disk, causing spurious MEP results to be obtained by the magnetic read head 40 for a subsequent region adjacent the physical defect. LDV head 30 results can therefore be used to verify data obtained by the magnetic read head 40 to check for spurious results so that such spurious results can be safely ignored. This is made possible since results arising from actual defects would be present in both sets of data obtained by the magnetic read head 30 and the LDV head 30, whereas spurious results would appear in only one of the sets of data obtained and can thus be safely ignored.

Whilst there has been described in the foregoing description exemplary embodiments of the present invention, it will be understood by those skilled in the technology concerned that many variations in details of design, construction and/or operation may be made without departing from the present invention.

What is claimed is:

1. A magnetic media tester comprising:
   a Laser Doppler Vibrometer (LDV) head;
   a magnetic read head;
   the LDV head and the magnetic read head being configured for obtaining correlatable data of a region on a magnetic disk, wherein data obtained by the magnetic read head and data obtained by the LDV head are correlated by calibration of the magnetic read head and calibration of the LDV head with a calibration feature on the magnetic disk; and
   a data enhancement module for enhancing data obtained by the LDV head,
   wherein the data enhancement module is configured to eliminate variation in a background signal and enhance at least one detected signal riding on the background signal, and
   wherein the data enhancement module is configured to define a set of sequential data points obtained by the LDV head encompassing the at least one detected signal, compute a fitted line value for each data point in the set of sequential data points, and square a difference between each data point and its fitted line value.

2. The magnetic media tester of claim 1, wherein the data enhancement module is further configured to accumulate the squared difference between each data point and its fitted line value.

3. The magnetic media tester of claim 1, wherein the region is a defect region, the LDV head being configured for determining location of the defect region and the magnetic read head being configured for characterizing a defect in the defect region.

4. The magnetic media tester claim 1, wherein data obtained by the LDV head is usable for verifying data obtained by the magnetic read head.

5. A method of magnetic media testing, the method comprising:
   calibrating a Laser Doppler Vibrometer (LDV) head and a magnetic read head on a magnetic media tester with a calibration feature on a magnetic disk to correlate data obtained by the LDV head and the magnetic read head;
   determining a region on the disk using the LDV head;
   characterizing a feature in the region using the magnetic read head; and
   enhancing data obtained by the LDV head, wherein enhancing data obtained by the LDV head comprises eliminating variation in a background signal and enhancing at least one detected signal riding on the background signal, and wherein eliminating variation in the background signal and enhancing the at least one detected signal comprises defining a set of sequential data points obtained by the LDV head encompassing the at least one detected signal, computing a fitted line value for each data point in the set of sequential data points, and squaring a difference between each data point and its fitted line value.

6. The method of claim 5, wherein calibrating comprises correlating location of the magnetic read head with location of an optical beam spot of the LDV head.

7. The method of claim 5, wherein calibrating further comprises concurrently scanning the calibration feature with the magnetic read head and the LDV head.

8. The method of claim 5, wherein enhancing data obtained by the LDV head further comprises accumulating the squared difference between each data point and its fitted line value.

9. The method of claim 5, further comprising verifying data obtained by the magnetic read head with data obtained by the LDV head.

10. A method of data enhancement for a complex signal set comprising a background signal and at least one detected signal riding on the background signal, the method comprising:
    eliminating variation in the background signal by defining a set of sequential data points in the complex signal set, computing a fitted line value for each data point in the set of sequential data points, and squaring a difference between each data point and its fitted line value;
    enhancing the at least one detected signal by encompassing the at least one detected signal within the set of sequential data points defined; and
    accumulating the squared difference between each data point and its fitted line value.

* * * * *